US012596484B2

(12) United States Patent (10) Patent No.: US 12,596,484 B2
Bozdag et al. (45) Date of Patent: Apr. 7, 2026

(54) APPARATUS AND METHOD FOR TWO-STEP READ OF RESISTIVE RANDOM ACCESS MEMORY

(71) Applicant: Sandisk Technologies, Inc., Milpitas, CA (US)

(72) Inventors: Deniz Bozdag, Sunnyvale, CA (US); Dimitri Houssameddine, Sunnyvale, CA (US); Juan P. Saenz, Menlo Park, CA (US); Mark Lin, Santa Clara, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 61 days.

(21) Appl. No.: 18/355,368

(22) Filed: Jul. 19, 2023

(65) Prior Publication Data

US 2024/0393957 A1 Nov. 28, 2024

Related U.S. Application Data

(60) Provisional application No. 63/504,665, filed on May 26, 2023.

(51) Int. Cl.
*G06F 3/06* (2006.01)
*G06F 12/02* (2006.01)
*G11C 13/00* (2006.01)

(52) U.S. Cl.
CPC .......... *G06F 3/0619* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 8,760,932 B2 | 6/2014 | Sridharan et al. | |
| 10,490,288 B1 | 11/2019 | Wang et al. | |
| 11,244,732 B2 | 2/2022 | Sharon et al. | |

(Continued)

FOREIGN PATENT DOCUMENTS

| | | |
|---|---|---|
| CN | 103140895 A | 6/2013 |
| CN | 103890849 B | 3/2017 |

(Continued)

*Primary Examiner* — Mark D Featherstone
*Assistant Examiner* — Matthew W Wahlin
(74) *Attorney, Agent, or Firm* — PEARL COHEN ZEDEK LATZER BARATZ LLP

(57) ABSTRACT

An apparatus is provided that includes a memory array and a control circuit. The memory array includes non-volatile memory cells each including a resistive random access memory element. The control circuit is configured to receive a read command that specifies an address of a first group of the non-volatile memory cells, use a first predetermined read reference value to perform a first read of the first group of the non-volatile memory cells to provide first read data, while performing the first read, retrieve from a memory a second predetermined read reference value corresponding to the specified address, and in response to a condition being satisfied regarding the first read data, use the second predetermined read reference value to perform a second read of the first group of the non-volatile memory cells to provide second read data.

11 Claims, 13 Drawing Sheets

(56)           References Cited

U.S. PATENT DOCUMENTS

2014/0185361 A1      7/2014  Oh et al.
2020/0026595 A1*     1/2020  Wang .................. G06F 11/1048
2020/0388332 A1     12/2020  Grobis et al.
2023/0101414 A1      3/2023  Hassner et al.
2023/0153198 A1*     5/2023  Huang .................. G06F 3/0679
                                                              714/723

FOREIGN PATENT DOCUMENTS

CN        106373606  B     2/2019
EP         1302948  A1     4/2003

* cited by examiner

300a

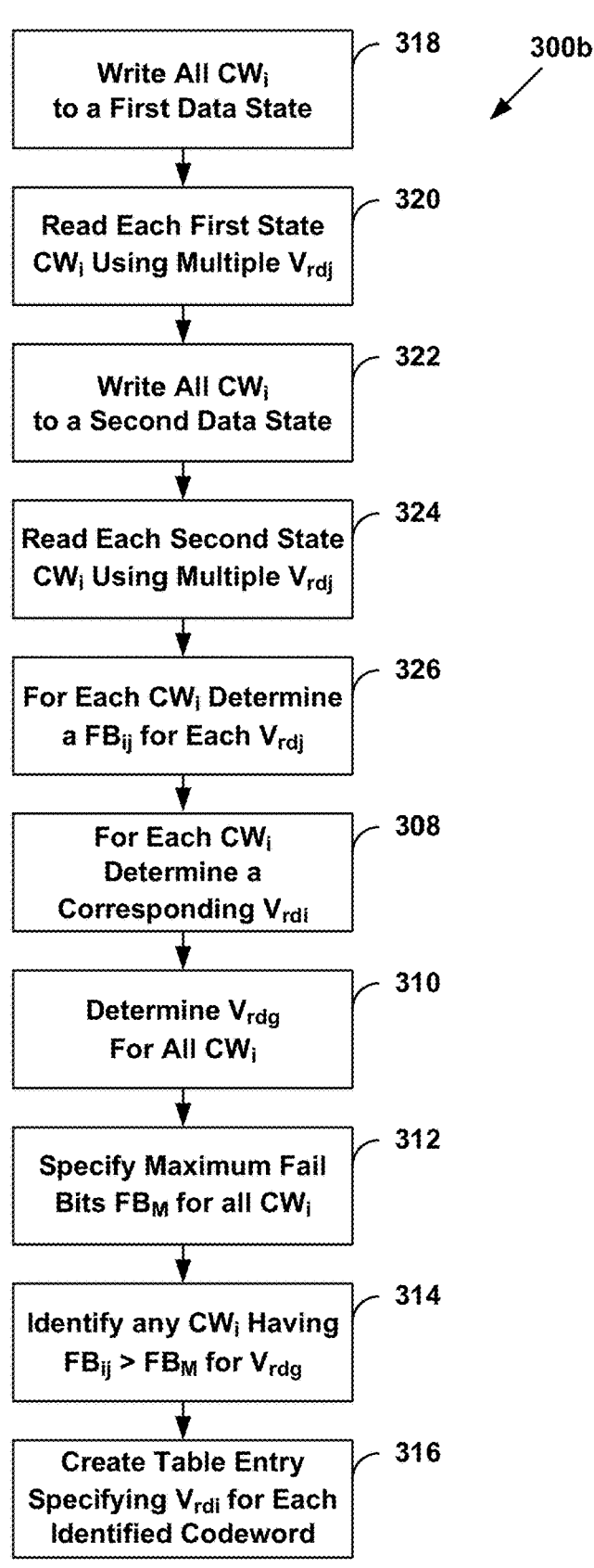

318 — Write All $CW_i$ to a First Data State

320 — Read Each First State $CW_i$ Using Multiple $V_{rdj}$

322 — Write All $CW_i$ to a Second Data State

324 — Read Each Second State $CW_i$ Using Multiple $V_{rdj}$

326 — For Each $CW_i$ Determine a $FB_{ij}$ for Each $V_{rdj}$

308 — For Each $CW_i$ Determine a Corresponding $V_{rdi}$

310 — Determine $V_{rdg}$ For All $CW_i$

312 — Specify Maximum Fail Bits $FB_M$ for all $CW_i$

314 — Identify any $CW_i$ Having $FB_{ij} > FB_M$ for $V_{rdg}$

316 — Create Table Entry Specifying $V_{rdi}$ for Each Identified Codeword

| | $V_{rd0}$ | $V_{rd1}$ | $V_{rd2}$ | $V_{rd3}$ |
|---|---|---|---|---|
| $CW_0$ | 5 | 0 | 5 | 4 |
| $CW_1$ | 4 | 1 | 4 | 4 |
| $CW_2$ | 0 | 5 | 3 | 5 |
| $CW_3$ | 4 | 0 | 5 | 4 |
| $CW_4$ | 4 | 1 | 0 | 5 |
| $CW_5$ | 3 | 6 | 4 | 0 |
| $CW_6$ | 1 | 2 | 3 | 3 |
| $Cw_7$ | 3 | 5 | 2 | 5 |
| Sum | 24 | 20 | 26 | 30 |

FIG. 4B

| | $V_{rd0}$ | $V_{rd1}$ | $V_{rd2}$ | $V_{rd3}$ |
|---|---|---|---|---|
| $CW_0$ | $FB_{00}$ | $FB_{01}$ | $FB_{02}$ | $FB_{03}$ |
| $CW_1$ | $FB_{10}$ | $FB_{11}$ | $FB_{12}$ | $FB_{13}$ |
| $CW_2$ | $FB_{20}$ | $FB_{21}$ | $FB_{22}$ | $FB_{23}$ |
| $CW_3$ | $FB_{30}$ | $FB_{31}$ | $FB_{32}$ | $FB_{33}$ |
| $CW_4$ | $FB_{40}$ | $FB_{41}$ | $FB_{42}$ | $FB_{43}$ |
| $CW_5$ | $FB_{50}$ | $FB_{51}$ | $FB_{52}$ | $FB_{53}$ |
| $CW_6$ | $FB_{60}$ | $FB_{61}$ | $FB_{62}$ | $FB_{63}$ |
| $Cw_7$ | $FB_{70}$ | $FB_{71}$ | $FB_{72}$ | $FB_{73}$ |

| Address | Individual Read Reference |
|---------|---------------------------|
| $Addr(CW_5)$ | $v_{rd3}$ |
|  |  |
|  |  |
|  |  |
|  |  |
|  |  |
|  |  |

$FB_M = 5$ bits

| Address | Individual Read Reference |
|---------|---------------------------|
| $Addr(CW_2)$ | $v_{rd0}$ |
| $Addr(CW_5)$ | $v_{rd3}$ |
| $Addr(CW_7)$ | $v_{rd2}$ |
|  |  |
|  |  |
|  |  |
|  |  |

$FB_M = 2$ bits

FIG. 4C

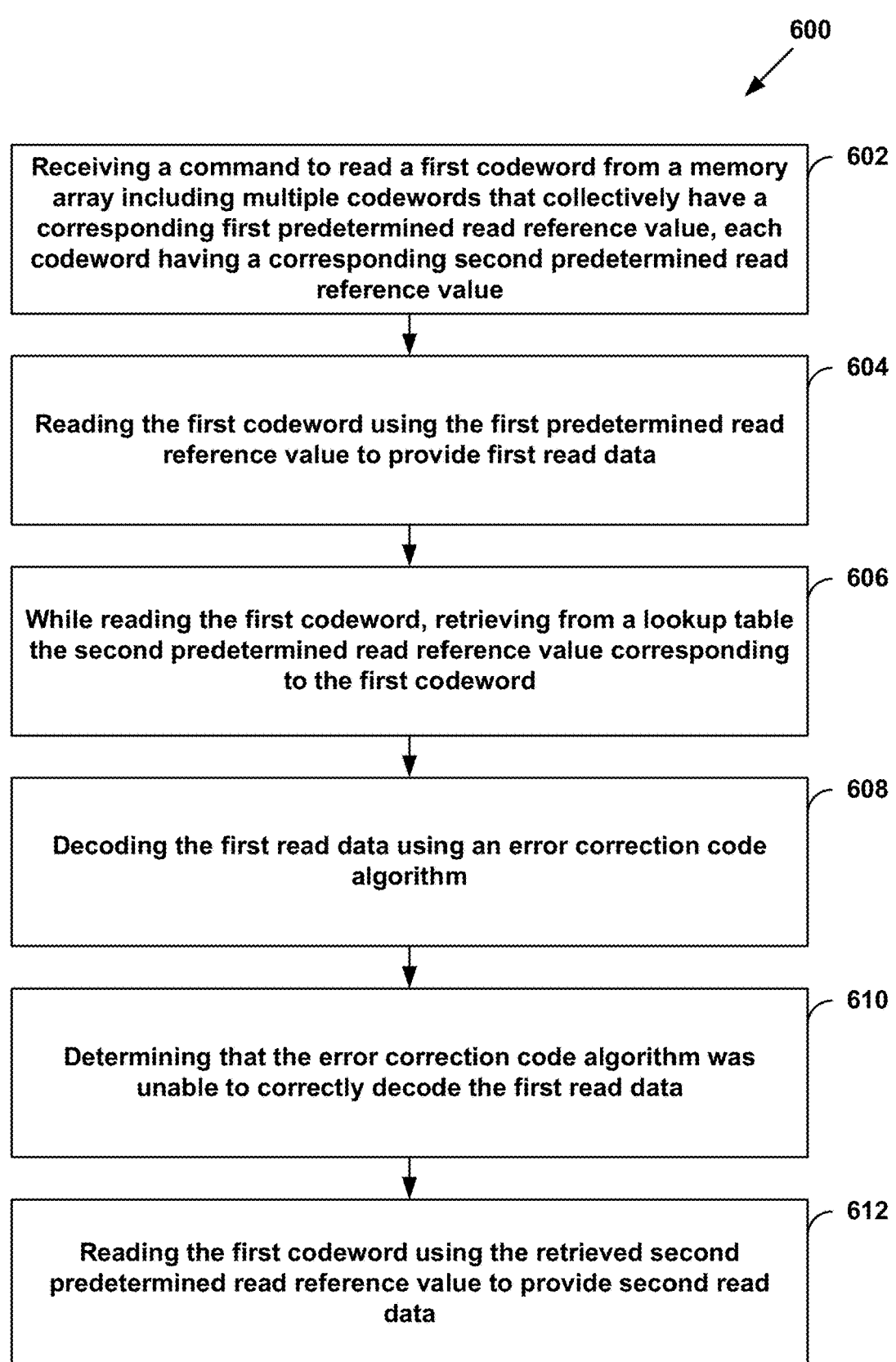

600

Receiving a command to read a first codeword from a memory array including multiple codewords that collectively have a corresponding first predetermined read reference value, each codeword having a corresponding second predetermined read reference value — 602

Reading the first codeword using the first predetermined read reference value to provide first read data — 604

While reading the first codeword, retrieving from a lookup table the second predetermined read reference value corresponding to the first codeword — 606

Decoding the first read data using an error correction code algorithm — 608

Determining that the error correction code algorithm was unable to correctly decode the first read data — 610

Reading the first codeword using the retrieved second predetermined read reference value to provide second read data — 612

FIG. 6

APPARATUS AND METHOD FOR TWO-STEP READ OF RESISTIVE RANDOM ACCESS MEMORY

CLAIM OF PRIORITY

The present application claims priority from U.S. Provisional Patent Application No. 63/504,665, entitled "APPARATUS AND METHOD FOR TWO-STEP READ OF RESISTIVE RANDOM ACCESS MEMORY," filed May 26, 2023, which is incorporated by reference herein in its entirety.

BACKGROUND

Memory is widely used in various electronic devices such as cellular telephones, digital cameras, personal digital assistants, medical electronics, mobile computing devices, non-mobile computing devices and data servers. Memory may be non-volatile memory or volatile memory. A non-volatile memory allows information to be stored and retained even when the non-volatile memory is not connected to a source of power (e.g., a battery).

One example of a non-volatile memory is magnetoresistive random access memory (MRAM), which uses magnetization to represent stored data, in contrast to some other memory technologies that store data using electronic charge. Generally, MRAM includes a large number of magnetic memory cells formed on a semiconductor substrate, where each memory cell represents one bit of data. A bit of data is written to a memory cell by changing the direction of magnetization of a magnetic element within the memory cell, and a bit is read by measuring the resistance of the memory cell (low resistance typically represents a "0" bit, and high resistance typically represents a "1" bit). As used herein, direction of magnetization is the direction of orientation of the magnetic moment.

Although MRAM is a promising technology, numerous challenges remain.

BRIEF DESCRIPTION OF THE DRAWINGS

Like-numbered elements refer to common components in the different figures.

FIG. 3B is a flow chart of an embodiment of an alternative process for creating a lookup table of individual read reference values for a group of codewords.

FIG. 4A is a table that illustrates failed bit counts for example codewords and example candidate read reference values.

FIG. 4B depicts the table of FIG. 4A will example numerical failed bit count values.

FIG. 4C depicts an example lookup table that includes entries created using the process of FIG. 3A, using the example data of FIG. 4B and a desired maximum failed bit count of two bits.

FIG. 4D depicts an example lookup table that includes entries created using the process of FIG. 3A, using the example data of FIG. 4B and a desired maximum failed bit count of five bits.

FIG. 6 is a flow chart of an embodiment of another process for reading codewords.

DETAILED DESCRIPTION

Figure 1A:
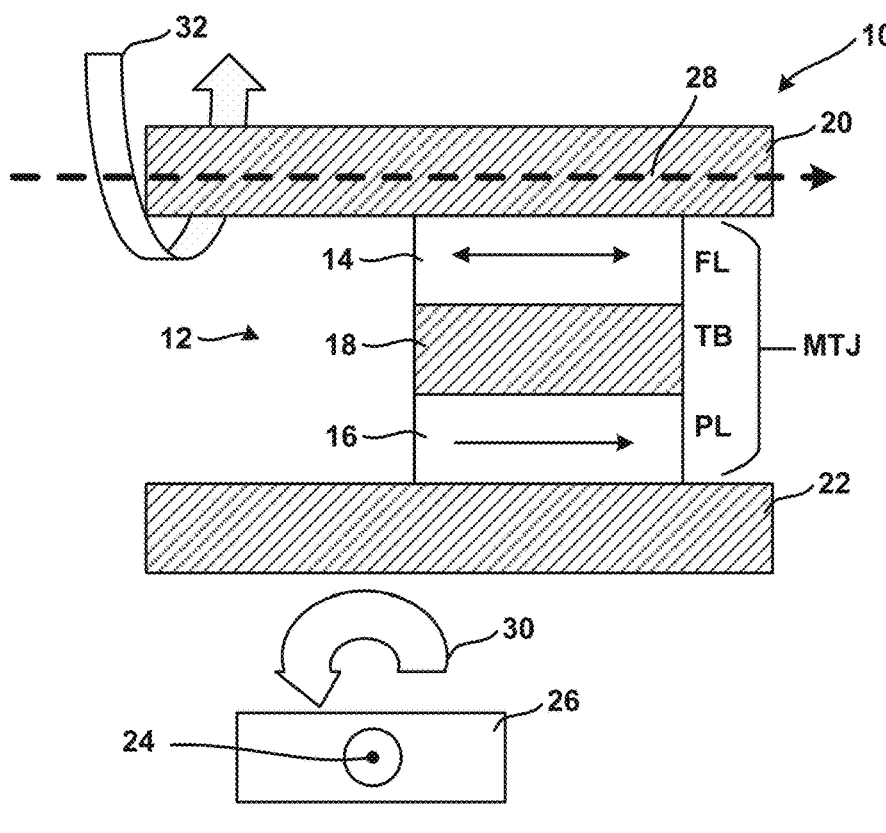
FIG. 1A is a block diagram of a MRAM memory cell.

Technology is described for a fast, two-step read of resistive random access memory cells, such as MRAM cells. In an embodiment, a codeword is read from a group of memory cells using a two-step read process. As used herein, a "codeword" includes a predetermined number of bits of data (e.g., 16 bits, 64 bits, 1024 bits, etc.). In an embodiment, a codeword includes a number of bits that may be encoded and decoded by a (typically on-die) error correction coding (ECC) engine. In an embodiment, a memory array includes multiple codewords, and each codeword has an associated address.

In an embodiment, a first read is performed of a codeword using a first predetermined read reference value that is used to distinguish between a first state (e.g., 0) and a second state (e.g., 1) for each bit in the codeword. As used herein, the first predetermined read reference value also is referred to as a "global read reference value."

In an embodiment, the global read reference value is selected for reading all codewords of the memory array. In an embodiment, the global read reference value may be determined during wafer sort, and has a value that results in a lowest number of bit errors for all codewords of the memory array.

In an embodiment, a compact, fast memory (e.g., a content addressable memory) stores a table (e.g., a lookup table) of codeword addresses and corresponding second read reference values. As used herein, the second predetermined read reference values also are referred to as a "individual read reference values."

In an embodiment, each individual read reference value is selected for reading a corresponding codeword of the memory array. In an embodiment, each individual read reference value may be determined during wafer sort, and has a value that results in a lowest number of bit errors for the corresponding codeword.

In an embodiment, while the first read of the codeword is performed using the global read reference value, the lookup table is searched to determine if there is an entry for the codeword address. If there is such an entry the individual read reference value corresponding to the codeword address is retrieved from the lookup table.

In an embodiment, if the first read fails (e.g., the ECC engine is unable to successfully decode the read bits), and if the lookup table includes an entry for the codeword address, a second read of the codeword is performed using the corresponding individual read reference value. In an embodiment, if however, the lookup table does not include an entry for the codeword address, the memory controller may perform further read fail processing (e.g., using a self-referenced read technique to read the specified codeword).

Without wanting to be bound by any particular theory, it is believed that the two-step read technology described below may result in more bits being read without needing to perform a self-referenced read, which requires multiple write operations and may increase write errors and reduce endurance. In this regard, without being bound by any particular theory it is believed that the two-step read technology described below may improve read reliability.

Without wanting to be bound by any particular theory, it is believed that the two-step read technology described below may minimize latency by using a fast lookup memory and searching for the individual read reference value during the first read operation. In this regard, without being bound by any particular theory it is believed that if the first read fails, the second read can begin very quickly and therefore may be very fast.

FIG. 1A is a schematic perspective view of a prior MRAM memory cell 10 that uses field-induced switching. Generally, MRAM memory cell 10 includes a magnetic tunnel junction (MTJ) 12 that includes an upper ferromagnetic layer 14, a lower ferromagnetic layer 16, and a tunnel barrier (TB) 18 which is an insulating layer between the two ferromagnetic layers. In this example, upper ferromagnetic layer 14 is a free layer (FL) that has a direction of magnetization that can be switched. Lower ferromagnetic layer 16 is a pinned (or fixed) layer (PL) that has a direction of magnetization that does not change.

When the direction of magnetization in free layer 14 is parallel to that of pinned layer 16, the resistance ($R_P$) (referred to herein as "parallel resistance $R_P$") across MRAM memory cell 10 is relatively low, due at least in part to spin dependent scattering of minority electrons. When the direction of magnetization in free layer 14 is anti-parallel to that of pinned layer 16, the resistance ($R_{AP}$) (referred to herein as "anti-parallel resistance $R_{AP}$") across MRAM memory cell 10 is relatively high, due at least in part to spin dependent scattering of minority and majority electrons. The memory state ("0" or "1") of MRAM memory cell 10 is read by measuring the resistance of MRAM memory cell 10. In this regard, electrical conductors 20/22 attached to MRAM memory cell 10 are utilized to read the MRAM data.

The direction of magnetization in free layer 14 changes in response to current 24 flowing in a digit line 26 and in response to current 28 flowing in a write line 20 that generate magnetic fields 30 and 32 respectively. FIG. 1A depicts the situation in which current 24 in digit line 26 is flowing out of the page, and current 28 in write line 20 is flowing from left to right. As a result, magnetic fields 30 and 32 are orthogonal, which will cause the direction of magnetization in free layer 14 to switch from parallel to anti-parallel relative to that of pinned layer 16. The orientation of a bit is switched by reversing the polarity of current 28 in write line 20 while keeping a constant polarity of current 24 in digit line 26.

The field induced switching technique described above for MRAM memory cell 10 of FIG. 1A has some practical limitations, particularly when the design calls for scaling the MRAM memory cell to smaller dimensions. For example, because this technique requires two sets of magnetic field write lines, the array of MRAM memory cells is susceptible to bit disturbs (i.e., neighboring cells may be unintentionally altered in response to the write current directed to a given cell).

Furthermore, decreasing the physical size of the MRAM memory cells results in lower magnetic stability against magnetization switching due to thermal fluctuations. The stability of the bit can be enhanced by utilizing a magnetic material for the free layer with a large magnetic anisotropy and therefore a large switching field, but then the currents required to generate a magnetic field strong enough to switch the bit are impractical in existing applications.

Figure 1B:
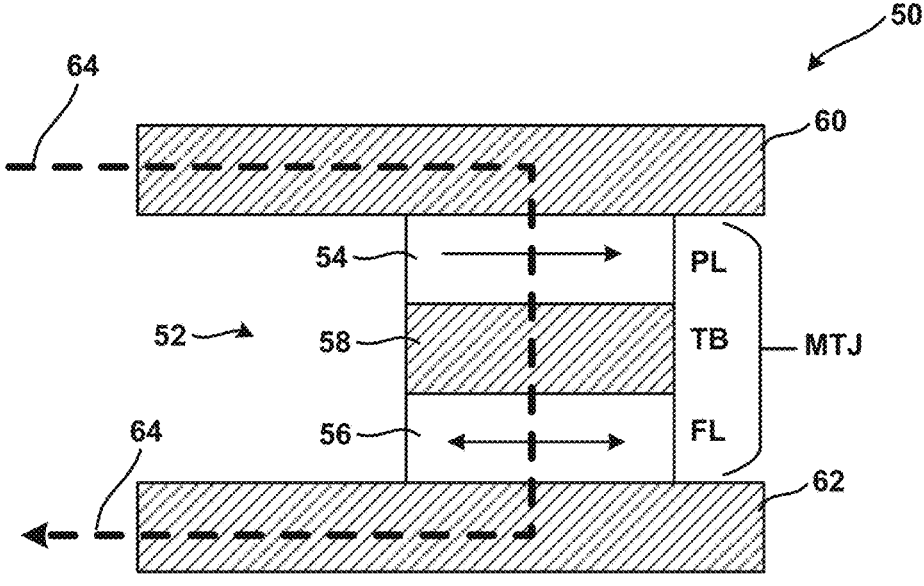
FIG. 1B is a block diagram of a MRAM memory cell.

Spin-transfer-torque (STT) switching is another technique for programming MRAM memory cells. FIG. 1B is a schematic representation of an STT-switching technique for an MRAM memory cell 50 that includes a magnetic tunnel junction 52 that includes an upper ferromagnetic layer 54, a lower ferromagnetic layer 56, and a tunnel barrier 58 which is an insulating layer between the two ferromagnetic layers. In this example, lower ferromagnetic layer 56 is the free layer that has a direction of magnetization that can be switched. Upper ferromagnetic layer 54 is the pinned (or fixed) layer that has a direction of magnetization that is not easily changed.

When the direction of magnetization in free layer 56 is parallel to that of pinned layer 54, the parallel resistance $R_P$ across MRAM memory cell 50 is relatively low. When the direction of magnetization in free layer 56 is anti-parallel to that of pinned layer 54, the anti-parallel resistance $R_{AP}$ across MRAM memory cell 50 is relatively high. The memory state ("0" or "1") of memory cell 50 is read by measuring the resistance of MRAM memory cell 50. In this regard, electrical conductors 60/62 attached to MRAM memory cell 50 are utilized to read the MRAM data. By design, both the parallel and anti-parallel configurations remain stable in the quiescent state and/or during a read operation (at sufficiently low read current).

In the remaining text and figures, direction of the write current is defined as the direction of the electron flow. Therefore, the term write current refers to an electron current.

To "set" the MRAM memory cell bit value (i.e., choose the direction of the free layer magnetization), an electrical write current 64 is applied from conductor 60 to conductor 62. The electrons in write current 64 become spin-polarized as they pass through pinned layer 54 because pinned layer 54 is a ferromagnetic metal. Although conduction electrons in a ferromagnetic metal will have spin orientation collinear with the direction of magnetization, a substantial majority of them will have a particular orientation that is parallel to the direction of magnetization, yielding a net spin polarized current. (Electron spin refers to angular momentum, which is directly proportional to but anti-parallel in direction to the magnetic moment of the electron, but this directional distinction will not be used going forward for ease of discussion.)

When the spin-polarized electrons tunnel across tunnel barrier 58, conservation of angular momentum can result in the imparting of a torque on both free layer 56 and pinned layer 54, but this torque is inadequate (by design) to affect the direction of magnetization of pinned layer 54. Contrastingly, this torque is (by design) sufficient to switch the direction of magnetization of free layer 56 to become parallel to that of pinned layer 54 if the initial direction of magnetization of free layer 56 was anti-parallel to pinned layer 54. The parallel magnetizations will then remain stable before and after such write current is turned OFF.

In contrast, if free layer 56 and pinned layer 54 magnetizations are initially parallel, the direction of magnetization of free layer 56 can be STT-switched to become anti-parallel to that of pinned layer 54 by application of a write current of opposite direction to the aforementioned case. Thus, by way of the same STT physics, the direction of the magnetization of free-layer 56 can be deterministically set into either of two stable orientations by judicious choice of the write current direction (polarity).

Figure 1C:
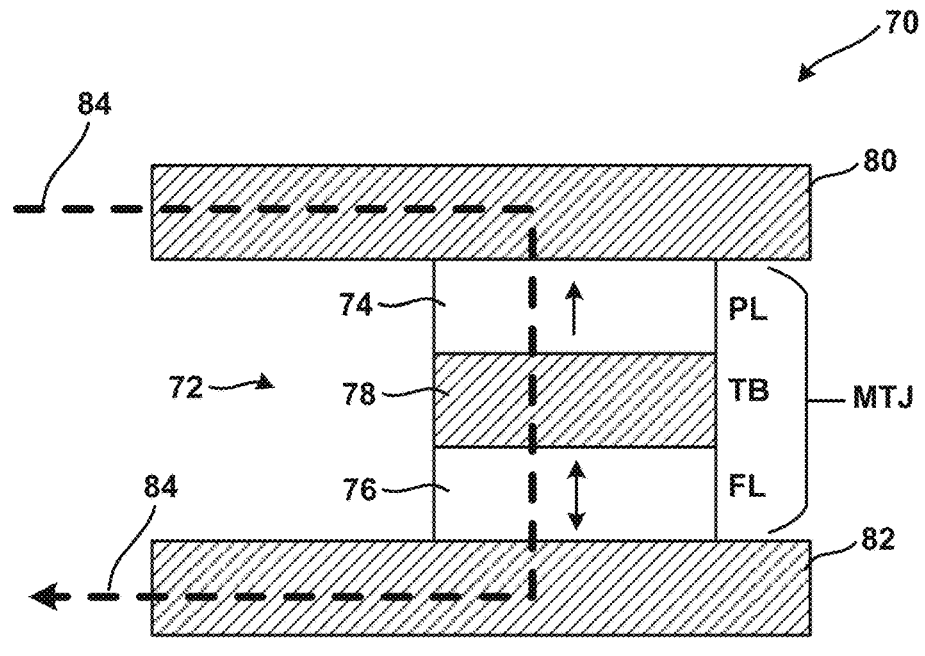
FIG. 1C is a block diagram of a MRAM memory cell.

MRAM memory cell 50 of FIG. 1B uses materials in which both the pinned and free-layer magnetization are in the in-plane direction. In contrast, FIG. 1C depicts a schematic representation of a STT-switching MRAM memory cell 70 in which both the pinned and free-layer magnetization are in the perpendicular direction. MRAM memory cell 70 includes a magnetic tunnel junction 72 that includes an upper ferromagnetic layer 74, a lower ferromagnetic layer 76, and a tunnel barrier 78 which is an insulating layer between the two ferromagnetic layers. In this example, lower ferromagnetic layer 76 is the free layer that has a direction of magnetization that can be switched. Upper ferromagnetic layer 74 is the pinned (or fixed) layer and that has a direction of magnetization that is not easily changed.

When the direction of magnetization in free layer 76 is parallel to that of pinned layer 74, the resistance $R_P$ across MRAM memory cell 70 is relatively low. When the direction of magnetization in free layer 76 is anti-parallel to that of pinned layer 74, the resistance $R_{AP}$ across MRAM memory cell 70 is relatively high. The memory state ("0" or "1") of MRAM memory cell 70 is read by measuring the resistance of MRAM memory cell 70. In this regard, electrical conductors 80/82 attached to MRAM memory cell 70 are utilized to read the MRAM data. By design, both the parallel and anti-parallel configurations remain stable in the quiescent state and/or during a read operation (at sufficiently low read current). To "set" the MRAM memory cell bit value (i.e., choose the direction of the free layer magnetization), an electrical write current 84 is applied from conductor 80 to conductor 82 and MRAM memory cell 70 operates as discussed above with respect to FIG. 1B.

Compared to the earliest MRAM memory cells which used magnetic fields from current carrying conductors proximate to the MRAM memory cell, the STT switching technique requires relatively low power, virtually eliminates the problem of adjacent bit disturbs, and has more favorable scaling for higher cell densities (reduced MRAM memory cell size). The latter issue also favors STT-MRAM where the free and pinned layer magnetizations are orientated perpendicular to the film plane, rather than in-plane. In practice, however, STT switching requires that the full write current flow through the tunnel barrier, which negatively affects long term reliability of the STT MRAM memory cell due to the necessary stress of moderate to high write voltages across the tunnel barrier.

Figure 1D:
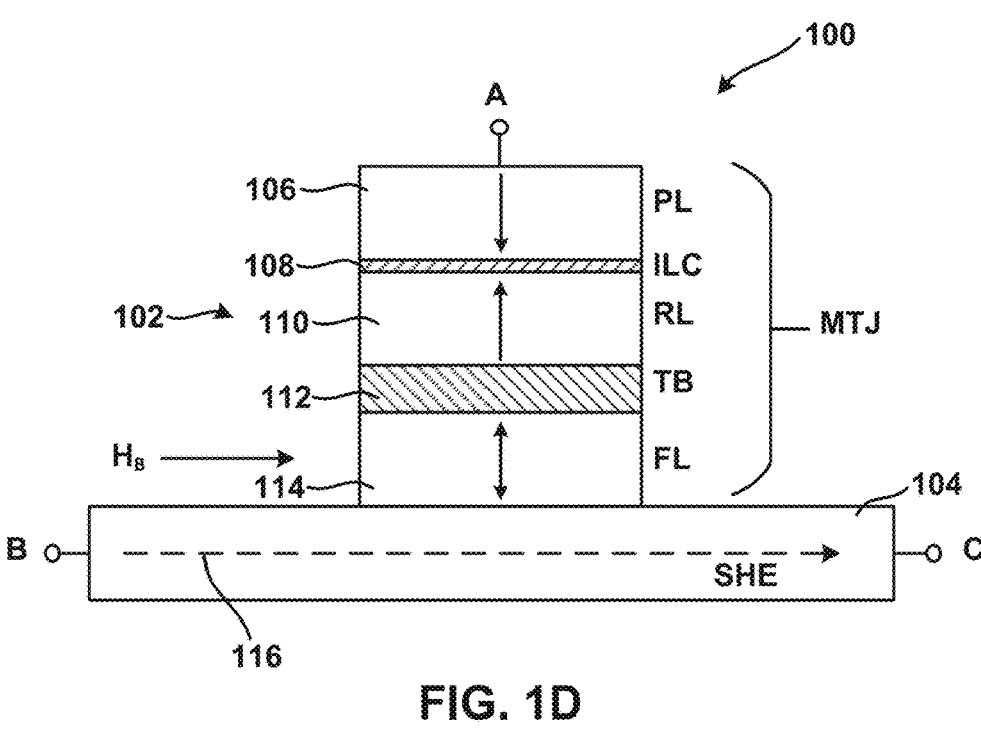
FIG. 1D is a block diagram of a MRAM memory cell.

FIG. 1D depicts an alternative MRAM memory cell 100 that makes use of spin orbit torque (SOT) for switching the free layer using spin current. The spin of an electron is an intrinsic angular momentum, which is separate from the angular momentum due to orbital motion of the electron. In a solid, the spins of many electrons can act together to affect the magnetic and electronic properties of a material, for example endowing it with a permanent magnetic moment as in a ferromagnet.

In many materials, electron spins are equally present in both the up and the down directions, and no transport properties are dependent on spin. However, various techniques can be used to generate a spin-polarized population of electrons, resulting in an excess of spin up or spin down electrons, to change the properties of a material. This spin-polarized population of electrons moving in a common direction through a common material is referred to as a spin current. As described herein, a spin current can be used to operate an MRAM memory cell.

In general, Spin Hall Effect (SHE) may be used to generate spin current flowing in a transverse (perpendicular to plane) direction when applying a charge current flow in a longitudinal (in-plane) direction. The spin polarization direction of such a Spin Hall Effect-generated spin current is in the in-plane direction orthogonal to the charge current flow. MRAM memory cell 100 includes three terminals A, B and C, magnetic tunnel junction 102 and SHE material 120.

In one implementation, magnetic tunnel junction 102 includes a free layer, a tunnel barrier and a pined layer. In another implementation, magnetic tunnel junction 102 includes pinned layer 106, inter-layer coupling (ILC) layer 108, reference layer (RL) 110, tunnel barrier 112 and free layer 114. The inter-layer coupling layer 108 promotes a strong antiferromagnetic (i.e., anti-parallel) coupling between pinned layer 106 and reference layer 110, such that their net magnetic moment mostly cancels, thus greatly reducing unwanted stray field on the free layer. Spin Hall Effect layer 104 includes a heavy metal, such as platinum, tantalum or tungsten, that has strong SHE. The direction of magnetization of free layer 114 is switched between up and down.

An advantage of the SOT-switching design that exploits the Spin Hall Effect is that the write current 116 passes solely through Spin Hall Effect layer 104, and does not flow through tunnel barrier 112. This eliminates the aforementioned long-term degradation of tunnel barrier 112 by the switching current in the prior STT switching design for MRAM memory cells.

Figure 1E:
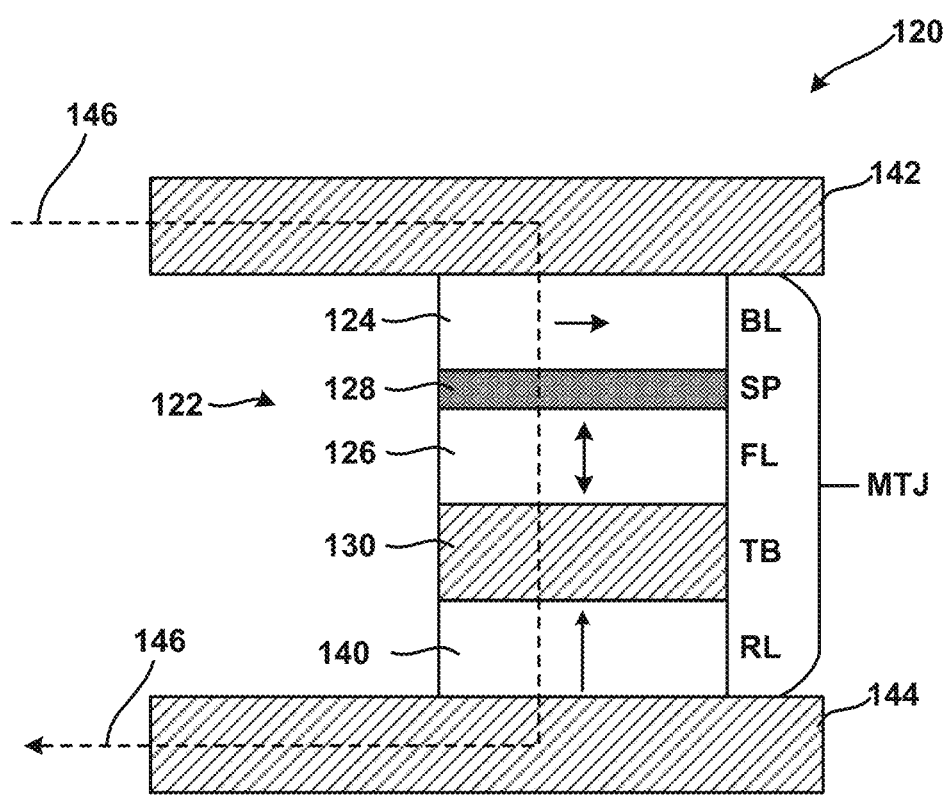
FIG. 1E is a block diagram of a MRAM memory cell.

FIG. 1E depicts a schematic representation of a voltage control of magnetic anisotropy (VCMA) MRAM memory cell 120. VCMA memory cell 120 is similar in structure to STT-switching MRAM memory cell 70 of FIG. 1C, with a few differences. MRAM memory cell 120 includes a magnetic tunnel junction 122 that includes an upper ferromagnetic layer 124, a lower ferromagnetic layer 126, a spacer layer (SP) 128, a tunnel barrier 130, and a reference layer 140. Upper ferromagnetic layer 124 is also referred to as bias layer 124, and lower ferromagnetic layer 126 is also referred to as free layer 126.

When the direction of magnetization in free layer 126 is parallel to that of reference layer 140, the resistance $R_P$ across MRAM memory cell 120 is relatively low. When the direction of magnetization in free layer 126 is anti-parallel to that of reference layer 140, the resistance $R_{AP}$ across MRAM memory cell 120 is relatively high. The memory state ("0" or "1") of MRAM memory cell 120 is read by measuring the resistance of MRAM memory cell 120. In this regard, electrical conductors 142/144 attached to MRAM memory cell 120 are utilized to read the MRAM data. The read process is the same as that of MRAM memory cell 70 of FIG. 1C, except the read polarity is chosen to be opposite the write polarity.

In an embodiment, write process of MRAM memory cell 120 is as follows: (1) MRAM memory cell 120 is read to determine its state, (2) if MRAM memory cell 120 is in the desired write state then the write process is terminated. (3) otherwise, a write voltage is applied to MRAM memory cell 120 in the polarity that reduces the magnetic anisotropy of the free layer to nearly zero (the free layer will precess around the magnetic field direction defined by the magnetic bias layer 124 while the write voltage is applied), (4) the write voltage is removed after ½ a precession cycle, and (5) steps 1-4 are repeated until the state is correctly written or the write process times out.

In embodiments, the materials and interfaces of free layer 126, spacer layer 128, and tunnel barrier 130 are chosen to provide a large VCMA coefficient for FL 126 to maximize how much the free layer magnetic anisotropy changes with applied voltage. This can necessitate using materials that increase the resistance of tunnel barrier 130. To achieve reliable switching, free layer 126 typically requires a small non-zero in-plane bias field. In an embodiment, the bias field is generated by bias layer 124. Alternatively, the in-plane field can be supplied by a magnet that is external to MRAM memory cell 120, or by an Oersted field generated by passing current through a wire close to the memory cell.

Figure 2A:
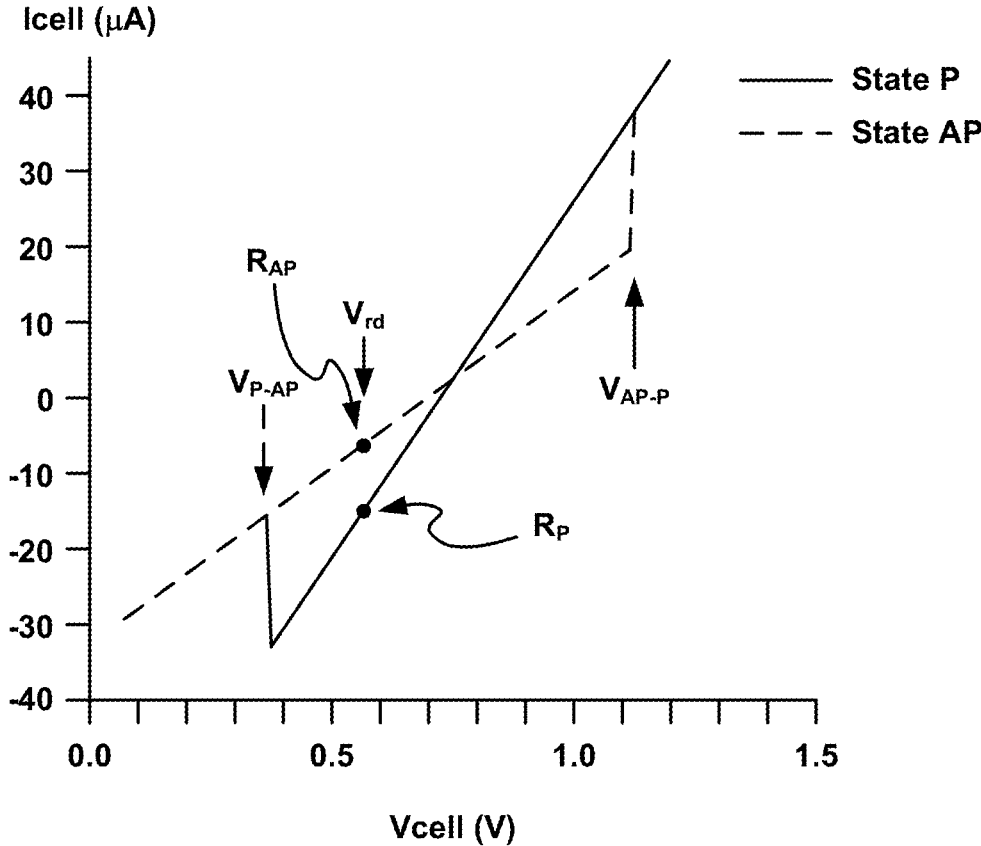
FIG. 2A depicts an example current-versus voltage characteristic of an MRAM memory cell.

FIG. 2A depicts example current-versus voltage characteristic of an MRAM memory cell, such as MRAM memory cells 10, 50, 70 and 100 of FIGS. 1A-1D, respectively. For simplicity, the discussion of FIG. 2A will reference MRAM memory cell 50 of FIG. 1B. In an embodiment, MRAM memory cell 50 may be reversibly switched between a "parallel state" (P) (depicted using a solid line in FIG. 2A) and an "anti-parallel state" (AP) (depicted using a dashed line in FIG. 2A). In parallel state P, the direction of magnetization in free layer 56 is parallel to that of pinned layer 54. In anti-parallel state AP, the direction of magnetization in free layer 56 is anti-parallel to that of pinned layer 54.

If MRAM memory cell 50 is initially in anti-parallel state AP, and an electron electrical write current 64 is applied from conductor 60 to conductor 62, MRAM memory cell 50 will switch to parallel state P. In the embodiment depicted in FIG. 2A, MRAM memory cell 50 switches from anti-parallel state AP to parallel state P at a write voltage $V_{AP-P}$ of about 1.12V between conductor 62 and conductor 60.

Conversely, If MRAM memory cell 50 is initially in parallel state P, and an electron electrical write current 64 is applied from conductor 62 to conductor 60, MRAM memory cell 50 will switch to anti-parallel state AP. In the embodiment depicted in FIG. 2A, MRAM memory cell 50 switches from parallel state P to anti-parallel state AP at a write voltage $V_{P-AP}$ of about 0.36V between conductor 62 and conductor 60.

The state of an MRAM memory cell, such as MRAM memory cell 50 of FIG. 1B, may be determined by applying a read reference (e.g., a read reference voltage $V_{rd}$) across the MRAM memory cell (e.g., between conductor 60 to conductor 62 of MRAM memory cell 50). The applied read reference $V_{rd}$ results in a current that is proportional to a resistance of the MRAM memory cell. In the embodiment depicted in FIG. 2A, at a read reference $V_{rd}$ of about 0.56V, MRAM memory cell 50 has an anti-parallel resistance $R_{AP}$ in anti-parallel state AP, and has a parallel resistance $R_P$ in parallel state P.

Thus, the state of the individual MRAM memory cell may be determined by detecting the resistance of the MRAM memory cell at read reference $V_{rd}$, and then comparing the detected resistance to a threshold resistance value $R_T$. If the detected resistance of the MRAM memory cell is greater than threshold resistance value $R_T$, the MRAM memory cell is determined to be in anti-parallel state AP, and if the detected resistance of the MRAM memory cell is less than threshold resistance value $R_T$, the MRAM memory cell is determined to be in parallel state P.

This read technique, which is referred to herein as a "single reference read" is very effective for reading an individual MRAM memory cell, because the anti-parallel resistance $R_{AP}$ value and parallel resistance $R_P$ value for an individual MRAM memory cell remain relatively constant. However, a group of MRAM memory cells (e.g., in a memory array of MRAM memory cells) often exhibits wide variation in the anti-parallel resistance $R_{AP}$ values and parallel resistance $R_P$ values between MRAM memory cells.

Figure 2B:
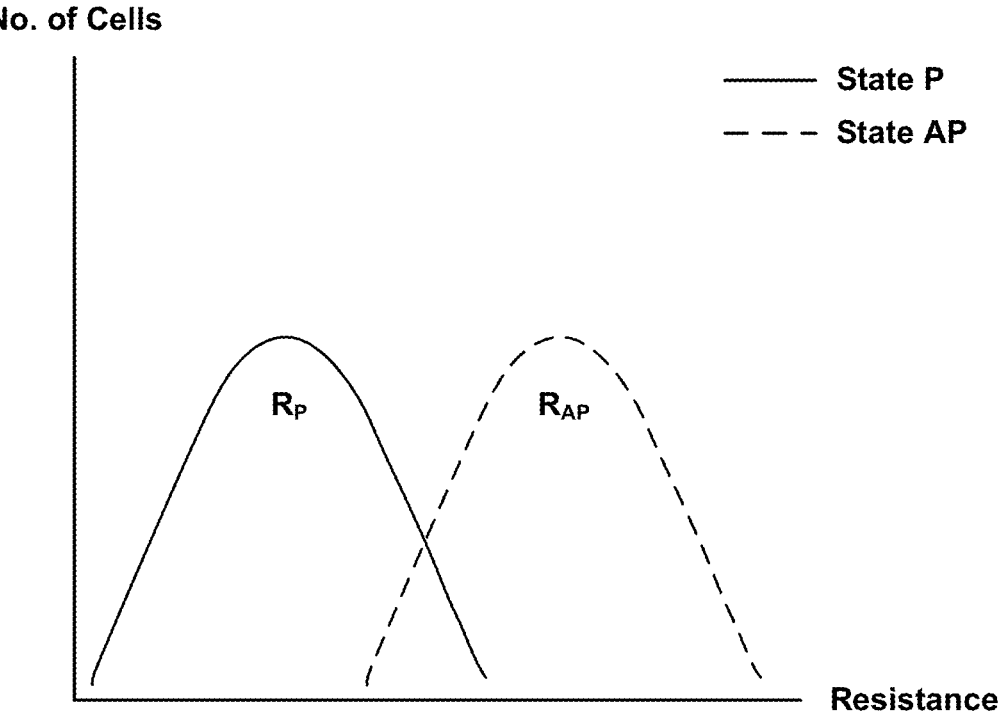
FIG. 2B is a diagram of example anti-parallel resistance values and parallel resistance values in a group of memory cells.

In addition, as depicted in FIG. 2B, anti-parallel resistance $R_{AP}$ values and parallel resistance $R_P$ values in a group of memory cells often overlap. As a result of this overlap, a single reference read of a group of memory cells can only accurately distinguish a finite number of bits. For simplicity, the remaining description uses the term "codeword" to describe a group of multiple memory cells that store a predetermined number of bits of data (e.g., 16 bits, 64 bits, 1024 bits, or some other number of bits of data). In an embodiment, a codeword includes a number of bits that may be encoded and decoded by a (typically on-die) error correction coding (ECC) engine.

Figure 2C:
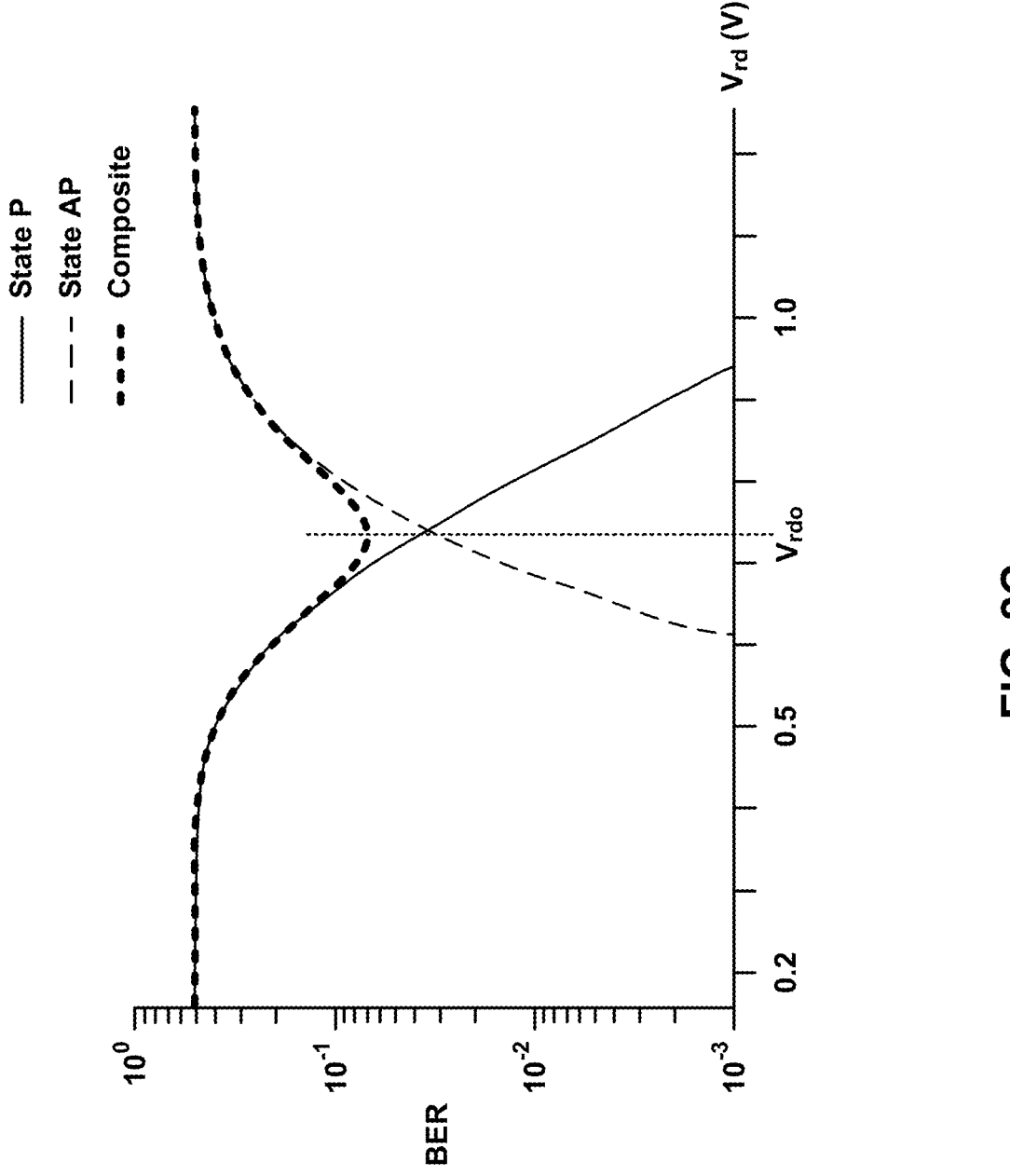
FIG. 2C depicts a graph of bit error rate versus read reference for a large population of memory cells in a memory array.

For example, FIG. 2C depicts a graph of bit error rate (BER) versus read reference $V_{rd}$ for a large population of memory cells (e.g., all memory cells in memory array that includes a large number of memory cells). The diagram indicates that for the entire population of memory cells, a lowest bit error rate of about 7% is achieved using an "optimal" read reference $V_{rdo}$ of about 0.73V.

Although some codewords may be successfully read using a single read reference $V_{rdo}$, for other codewords a number of bit errors that occur using a single read reference $V_{rdo}$ may exceed a maximum number of bit errors that may be corrected by an ECC engine. In such instances, the codeword typically is read using an alternative read technique, such as a self-referenced read.

For example, one self-referenced read technique a memory cell is first read, then written to a first memory state, a second read is performed, and then the results of the first and second read are compared. If the two read results are the same, the memory cell is determined to have originally been in the first memory state and remains in the first memory state. If, however, the two read results are not the same, the memory cell is determined to have originally been in a second memory state but is now in the first memory state. As a result, a write operation is needed to restore the memory cell to the second memory state.

Although such self-referenced read techniques may be used to successfully read codewords that could not be successfully read using a single reference read, the self-referenced read requires at least two reads and one write operation, and may require an additional write operation. Such self-referenced read techniques therefore require a long time to complete and are susceptible to write errors and also may reduce memory cell endurance.

To overcome these deficiencies, a two-step read technology is proposed for reading MRAM memory cells. In particular, technology is described for a fast, two-step read of resistive random access memory cells, such as MRAM cells. In an embodiment, a codeword having a specified address is read from a group of memory cells using a two-step read process. In an embodiment, the first read of the codeword is performed using a global read reference value.

In an embodiment, while the first read is performed, a lookup table is searched to determine if there is an entry for the specified address. In an embodiment, the lookup table includes codeword addresses and corresponding individual read reference values. In an embodiment, if the lookup table includes an entry for the specified address a second read of the codeword is performed using the corresponding individual read reference value for the codeword.

In an embodiment, the global read reference value is a read reference value selected for reading all codewords of the memory array. In an embodiment, the global read reference value may be determined during wafer sort, and has a value that results in a lowest number of bit errors for all codewords of the memory array.

In an embodiment, each individual read reference value is selected for reading a corresponding codeword of the memory array. In an embodiment, each individual read reference value may be determined during wafer sort, and has a value that results in a lowest number of bit errors for the codeword.

Figure 3A:
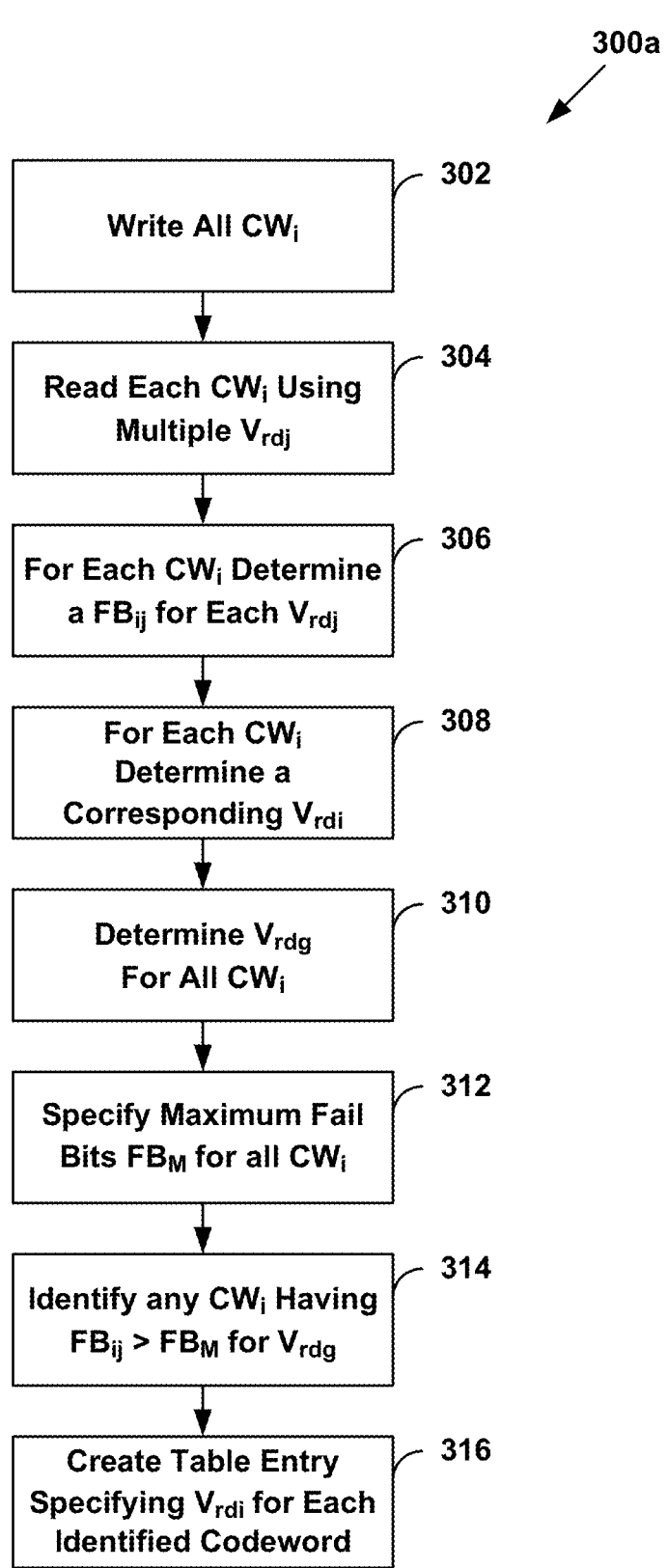
FIG. 3A is a flow chart of an embodiment of a process for creating a lookup table of individual read reference values for a group of codewords.

FIG. 3A is a flow chart of an embodiment of a process 300a for creating a lookup table of individual read reference values for a group of codewords. In an embodiment, process 300a may be performed by a system control circuit, described below.

In an embodiment, the lookup table is addressed by codeword addresses. In an embodiment, the group of codewords includes all codewords of a memory array. In another embodiment, the group of codewords includes fewer than all codewords of a memory array.

For simplicity, the remaining description assumes that the group of codewords includes m codewords $CW_i$, $i=0$, $1, 2, \ldots, m-1$. In addition, for simplicity the remaining description uses the term "all codewords" to mean all codewords $CW_i$ in the group of m codewords, and uses the term "each codeword $CW_i$" to mean each codeword $CW_i$ in the group of m codewords.

At step 302, data are written to all codewords $CW_i$. In an embodiment, all bits of codewords $CW_i$ are written to a first memory state (e.g., 0). Alternatively, all bits of codewords $CW_i$ may be written to a second memory state (e.g., 1).

At step 304, each codeword $CW_i$ is sequentially read using multiple candidate read reference values. In an embodiment, each codeword $CW_i$ is sequentially read using n candidate read reference values $v_{rdj}$, $j=0, 1, 2, \ldots, n-1$. For example, the candidate read reference values $v_{rdj}$ may be selected based on simulation results, empirical evidence, or a combination of the two, or by some other method.

At step 306, based on the read results of step 304 a failed bit count $FB_{ij}$ is determined for each codeword $CW_i$ and each candidate read reference value $v_{rdj}$. Alternatively, a bit error rate $BER_{ij}$ may be determined for each codeword $CW_i$ and each candidate read reference value $v_{rdj}$.

FIG. 4A depicts in table form an example in which m=8 and n=4. In the illustrated example, codeword $CW_0$ has a failed bit count $FB_{00}$ when read using candidate read reference value $v_{rdo}$, codeword $CW_1$ has a failed bit count $FB_{12}$ when read using candidate read reference value $v_{rd2}$, codeword $CW_5$ has a failed bit count $FB_{51}$ when read using candidate read reference value $v_{rd1}$, and so on.

FIG. 4B depicts the table of FIG. 4A will example numerical failed bit count values. For example, codeword $CW_2$ has a failed bit count $FB_{22}=3$ when read using candidate read reference value $v_{rd2}$, codeword $CW_4$ has a failed bit count $FB_{40=4}$ when read using candidate read reference value $v_{rdo}$, codeword $CW_6$ has a failed bit count $FB_{61=2}$ when read using candidate read reference value $v_{rd1}$, and so on.

Referring again to FIG. 3A, at step 308 for each codeword $CW_i$ determine a corresponding individual read reference value $v_{rd1}$. In an embodiment, an individual read reference value $v_{rd1}$ for a codeword $CW_i$ has a lowest failed bit count $FB_{ij}$ for $j=0, 1, 2, \ldots, n-1$. So using the example values of FIG. 4B, the corresponding individual read reference values $v_{rd1}$ are:

| Codeword | Lowest FBC | Corresponding Individual Read Reference |
|---|---|---|
| $CW_0$ | $FB_{01} = 0$ | $v_{rd0} = v_{rd1}$ |
| $CW_1$ | $FB_{11} = 0$ | $v_{rd1} = v_{rd1}$ |
| $CW_2$ | $FB_{20} = 0$ | $v_{rd2} = v_{rd0}$ |
| $CW_3$ | $FB_{31} = 0$ | $v_{rd3} = v_{rd1}$ |
| $CW_4$ | $FB_{41} = 0$ | $v_{rd4} = v_{rd2}$ |
| $CW_5$ | $FB_{53} = 0$ | $v_{rd5} = v_{rd3}$ |
| $CW_6$ | $FB_{60} = 1$ | $v_{rd6} = v_{rd0}$ |
| $CW_7$ | $FB_{72} = 2$ | $v_{rd7} = v_{rd2}$ |

Referring again to FIG. 3A, at step 310 determine a global read reference value $v_{rdg}$ for all codewords $CW_i$. In an embodiment, a global read reference value $v_{rdg}$ for all codewords $CW_i$ is a read reference value $v_{rdj}$ that results in a lowest sum of failed bit counts $FB_{ij}$ for $i=0, 1, 2, \ldots, m-1$. So using the example values of FIG. 4B, read reference value $v_{rd1}$ results in a lowest sum (20 failed bits) and thus in this example a global read reference value $v_{rdg}=v_{rd1}$ for all codewords $CW_i$.

Referring again to FIG. 3A, at step 312 a desired maximum failed bit count $FB_M$ for each codeword $CW_i$ is specified. For example, the desired maximum failed bit count $FB_M$ may be 2 bits, 3 bits, etc.

At step 314, any codewords $CW_i$ are identified that have a failed bit count $FB_{ij}$ greater than the desired maximum failed bit count $FB_M$ (i.e., $FB_{ij}>FB_M$) when the codeword is read using the global read reference value $v_{rdg}$.

For example, referring again to the example values of FIG. 4B, if the desired maximum failed bit count $FB_M=2$ bits, codewords $CW_2$, $CW_5$ and $CW_7$ each have a failed bit count $FB_{ij}$ greater than the desired maximum failed bit count $FB_M$ when the codeword is read using the global read reference value $v_{rdg}=v_{rd1}$. Alternatively, if the desired maximum failed bit count $FB_M=5$ bits, codeword $CW_5$ has a failed bit count $FB_{ij}$ greater than the desired maximum failed bit count $FB_M$ when the codeword is read using the global read reference value $v_{rdg}=v_{rd1}$.

Referring again to FIG. 3A, at step 316 an entry in a lookup table is created for each codeword $CW_i$ identified in step 314. In an embodiment, each lookup table entry includes an address of each codeword $CW_i$ identified in step 314, and the corresponding individual read reference value $v_{rd1}$ for the identified codeword $CW_i$.

FIG. 4C depicts an example lookup table 400c that includes entries created at step 316 of process 300a, using the example data of FIG. 4B and a desired maximum failed bit count $FB_M=2$ bits. In particular, lookup table 400c includes a first entry that includes an address of codeword $CW_2$ and its corresponding individual read reference value $v_{rd0}$, a second entry that includes an address of codeword $CW_5$ and its corresponding individual read reference value $v_{rd3}$, and a third entry that includes an address of codeword $CW_7$ and its corresponding individual read reference value $v_{rd2}$.

FIG. 4D depicts an example lookup table 400d that includes entries created at step 316 of process 300a, using the example data of FIG. 4B and a desired maximum failed bit count $FB_M=5$ bits. In particular, lookup table 400d includes a single entry that includes an address of codeword $CW_5$ and its corresponding individual read reference value $v_{rd3}$.

Thus, without wanting to be bound by any particular theory, it is believed that these examples illustrate that as the desired maximum failed bit count $FB_M$ decreases, the number of lookup table entries typically increases because more codewords $CW_i$ may have a failed bit count $FB_{ij}$ greater than the desired maximum failed bit count $FB_M$ when the codeword is read using the global read reference value $v_{rdg}$.

In example process 300a above, at step 302 all codeword $CW_i$ bits are written to either a first memory state (e.g., 0) or a second memory state (e.g., 1). For some memory devices, however, a codeword may have a first failed bit count when the codeword is written to the first memory state, and may have a second failed bit count when the codeword is written to the second memory state. In some embodiments, the first failed bit count may be higher or lower than the second failed bit count. That is, a codeword may have a higher failed bit count depending on the data written to the codeword.

FIG. 3B is a flow chart of an embodiment of an alternative process 300b for creating a lookup table of individual read reference values for a group of codewords. Example process 300b is similar to example process 300a of FIG. 3A, but includes writing all bits of each codeword $CW_i$ to both a first memory state and a second memory state. In an embodiment, process 300b may be performed by a system control circuit, described below.

At step 318, during a first write operation all bits of codewords $CW_i$ are written to a first memory state (e.g., 0).

At step 320, during a first read operation each codeword $CW_i$ is sequentially read using multiple candidate read reference values. In an embodiment, each codeword $CW_i$ is sequentially read using n candidate read reference values $v_{rdj}$, j=0, 1, 2, . . . , n–1. For example, the candidate read reference values $v_{raj}$ may be selected based on simulation results, empirical evidence, or a combination of the two, or by some other method.

At step 322, during a second write operation all bits of codewords $CW_i$ are written to a second memory state (e.g., 1).

At step 324, during a second read operation each codeword $CW_i$ is sequentially read using the same multiple candidate read reference values used at step 320.

At step 326, based on the read results of step 320 and the read results of step 324, a failed bit count $FB_{ij}$ is determined for each codeword $CW_i$ and each candidate read reference value $v_{rdj}$. In an embodiment, for each codeword $CW_i$ the determined failed bit count $FB_{ij}$ is the larger of the failed bit count from the first read operation and the second read operation. Alternatively, a bit error rate $BER_{ij}$ may be determined for each codeword $CW_i$ and each candidate read reference value $v_{rdj}$. In an embodiment, for each codeword $CW_i$ the determined bit error rate $BER_{ij}$ is the larger of the bit error rate from the first read operation and the second read operation.

The remaining steps 308-316 of process 300b are the same as that of process 300a but using the failed bit count $FB_{ij}$ determined at step 326 that is based on two separate write and read operations of each codeword $CW_i$. Without wanting to be bound by any particular theory, it is believed that process 300b may result in identifying individual read reference values that work for both the first memory state and the second memory state.

At steps 302, 318 and 322 in example processes 300a and 300b above, all bits of codewords $CW_i$ are all written to either a first memory state or a second memory state. That is, all bits of all codewords $CW_i$ are written to the first memory state or the second memory state. Persons of ordinary skill in the art will understand that codeword bits alternatively may be written using predetermined random bit patterns (e.g., "0101010 . . . ," "0100010 . . . ," "11110000 . . . " or some other predetermined random bit pattern).

In an embodiment, example processes 300a and 300b above may be performed one time. For example, processes

300a and 300b above may be performed at wafer sort and lookup table entries created at step 316 may be stored in a lookup table stored in a memory on a memory die. In an embodiment, the lookup tables may be stored in a compact, fast memory structure such as a content addressable memory (CAM) or other type of memory.

In other embodiments, example processes 300a and 300b above may be performed more than one time. For example, example processes 300a and 300b above may be initially performed at wafer sort to create initial entries in a lookup table, and may subsequently be performed one or more additional times to create updated or additional entries in the lookup table over the life of the memory die.

Figure 5:
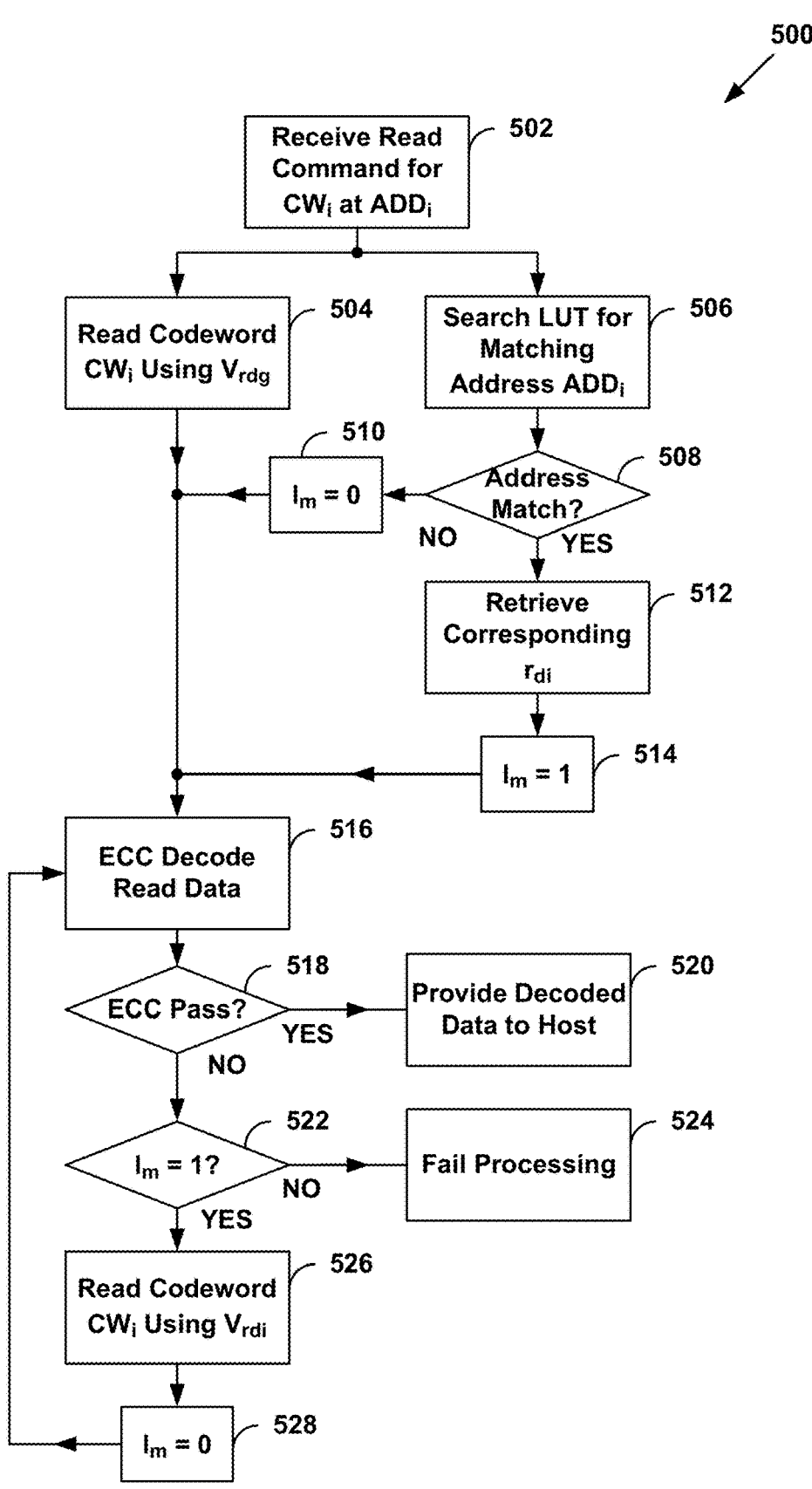
FIG. 5 is a flow chart of an embodiment of a process for reading codewords.

FIG. 5 is a flow chart of an embodiment of a process 500 for reading codewords. In an embodiment, process 500 may be performed by a system control circuit, described below.

At step 502, a read command is received. For example, a host device may send a read command to a memory controller. In an embodiment, a read command specifies addresses of one or more codewords $CW_i$ to be read. For simplicity, the following description assumes the received read command specifies a single address $ADD_i$ for a single codeword $CW_i$.

At step 504, the codeword $CW_i$ at specified address $ADD_i$ is read using a global read reference value, such as global read reference value $v_{rdg}$ determined at step 310 of process 300a of FIG. 3A or process 300b of FIG. 3B.

At step 506 a search is performed of the lookup table created using process 300a of FIG. 3A or process 300b of FIG. 3B (e.g., lookup table 400c of FIG. 4C or lookup table 400d of FIG. 4D) to determine if the lookup table includes an entry for the specified address $ADD_i$.

At step 508 a determination is made whether the lookup table includes a matching address $ADD_i$. If a determination is made at step 508 that the lookup table does not include a matching address $ADD_i$, at step 510 a match flag $I_m$ is set equal to 0.

If a determination is made at step 508 that the lookup table includes a matching address $ADD_i$, then at step 512 the corresponding individual read reference value $v_{rd1}$ for the codeword at address $ADD_i$ is retrieved from the lookup table. At step 514 match flag $I_m$ is set equal to 1.

In an embodiment, steps 506-514 are performed in parallel with the read operation performed in step 504. In an embodiment, steps 506-514 are performed while the read operation is performed in step 504. In an embodiment, a time required to complete steps 506-514 is less than or equal to a time required to complete the read operation performed in step 504.

At step 516, the read data from step 504 are decoded (e.g., using an ECC engine). An ECC engine typically can successfully correct a maximum number of bit errors $ECC_M$ (e.g., $ECC_M$=5 bits, 7 bits, or some other maximum number of bits). If the data read at step 504 includes less than or equal to $ECC_M$ bit errors then the ECC engine can successfully correct the errors and the ECC operation will pass. If, however, the data read at step 504 includes more than $ECC_M$ bit errors then the ECC engine cannot successfully correct the errors and the ECC operation will fail.

At step 518, a determination is made whether the ECC operation at step 516 passed. If a determination is made at step 518 that the ECC engine successfully decoded the data read at step 504, then at step 520 the decoded data are provided to the host.

If, however, a determination is made at step 518 that the ECC engine was unable to successfully decode the data read at step 504, then at step 522 a determination is made whether match flag $I_m$=1.

If at step 522 a determination is made that match flag $I_m$ does not equal 1, then at step 524 fail processing operations may be performed. In an embodiment, fail processing operations may include performing an overwrite read operation on codeword $CW_i$.

If at step 522, however, a determination is made that match flag $I_m$ equals 1, then at step 526 codeword $CW_i$ at specified address $ADD_i$ is read again, but this time using the corresponding individual read reference value $v_{rd1}$ that was retrieved from the lookup table at step 512.

At step 528, match flag $I_m$ is set equal to 0, and then process 500 loops back to step 516 to decode the read data, this instance using the data read at step 526.

At step 518, a determination is made whether the ECC operation at step 516 passed. If a determination is made at step 518 that the ECC engine successfully decoded the data read at step 504, then at step 520 the decoded data are provided to the host.

If, however, a determination is made at step 518 that the ECC engine was unable to successfully decode the data read at step 504, then at step 522 a determination is made whether match flag $I_m$=1. Because match flag $I_m$ was reset to 0 at step 528, at step 524 fail processing operations may be performed such as described above.

Without wanting to be bound by any particular theory, it is believed that process 500 may improve reduce time required to read codewords. In particular, a specified codeword $CW_i$ is first read using a global read reference value $v_{rdg}$. Without wanting to be bound by any particular theory, it is believed that in many instances such a read may be successful, even if the lookup table includes an entry for address $ADD_i$ of the specified codeword $CW_i$.

If, however, the first read is unsuccessful and if the lookup table includes an entry for address $ADD_i$ of the specified codeword $CW_i$, then specified codeword $CW_i$ is read a second time using the corresponding individual read reference value $v_{rd1}$ that was retrieved from the lookup table. Without wanting to be bound by any particular theory, it is believed that such a second read will be successful because the second read uses an individual read reference value $v_{rd1}$ specifically selected for the specified codeword $CW_i$.

If, however, the second read is unsuccessful fail processing operations, such as performing an overwrite read on the specified codeword $CW_i$ may be used to successfully read the codeword.

Without wanting to be bound by any particular theory, it is believed that because the lookup table is searched and any matching individual read reference value $v_{rd1}$ is retrieved in parallel with the first read operation, the second read operation may be performed quickly and without a need for a trial and error attempt to find an alternative read reference value that may be used to successfully read the specified codeword $CW_i$.

In addition, without wanting to be bound by any particular theory, it is believed that the described process may eliminate or substantially reduce a number of overwrite read operations needed to read codewords on the memory die.

FIG. 6 is a flow chart of an embodiment of a process 600 for reading codewords. In an embodiment, process 600 may be performed by a system control circuit, described below.

At step 602, receiving a command to read a first codeword from a memory array that includes multiple codewords that collectively have a corresponding first predetermined read reference value, each codeword having a corresponding second predetermined read reference value.

At step 604, reading the first codeword using the first predetermined read reference value to provide first read data.

At step 606, while reading the first codeword, retrieving from a lookup table the second predetermined read reference value corresponding to the first codeword.

At step 608, decoding the first read data using an error correction code algorithm.

At step 610, determining that the error correction code algorithm was unable to correctly decode the first read data.

At step 612, reading the first codeword using the retrieved second predetermined read reference value to provide second read data.

Figure 7:
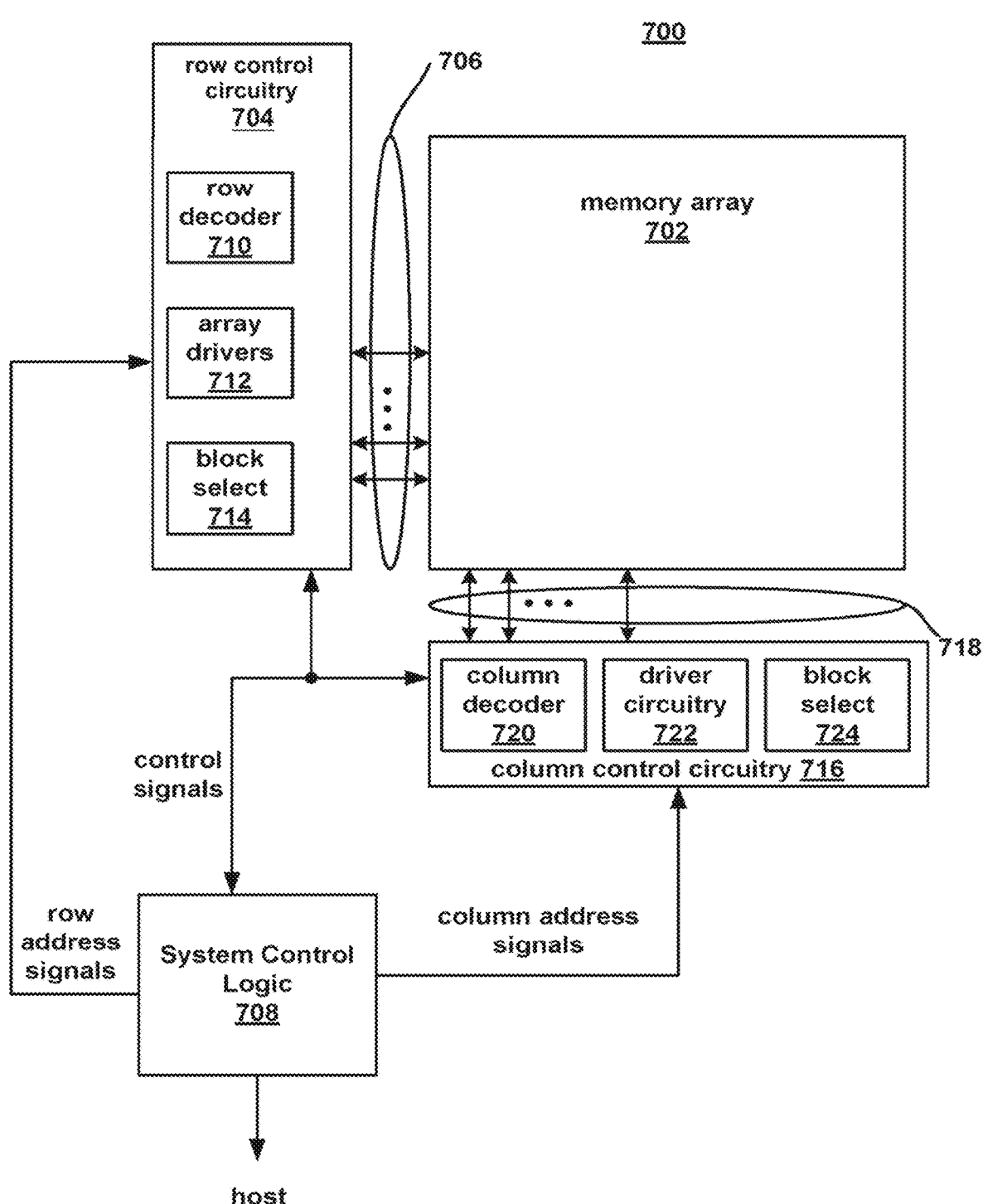
FIG. 7 is a block diagram of a memory system that uses the read techniques described herein.

FIG. 7 is a block diagram that depicts one example of a memory system 700 that can implement the technology described herein. Memory system 700 includes a memory array 702 that can include any of the memory cells described above. The array terminal lines of memory array 702 include the various layers of word lines organized as rows, and the various layers of bit lines organized as columns. However, other orientations also can be implemented.

Memory system 700 includes row control circuitry 704, whose outputs 706 are connected to respective word lines of the memory array 702. Row control circuitry 704 receives a group of M row address signals and one or more various control signals from System Control Logic circuit 708, and typically may include such circuits as row decoders 710, array terminal drivers 712, and block select circuitry 714 for both reading and writing operations.

Memory system 700 also includes column control circuitry 716 whose input/outputs 718 are connected to respective bit lines of the memory array 702. Column control circuitry 716 receives a group of N column address signals and one or more various control signals from System Control Logic 708, and typically may include such circuits as column decoders 720, array terminal receivers or drivers 722, block select circuitry 724, as well as read/write circuitry, and I/O multiplexers.

System control logic 708 receives data and commands from a host and provides output data to the host and status. In other embodiments, system control logic 708 receives data and commands from a separate controller circuit and provides output data to that controller circuit, with the controller circuit communicating with the host. System control logic 708 may include one or more state machines, registers and other control logic for controlling the operation of memory system 700.

In an embodiment, system control logic 708 includes a memory structure (not shown) for storing lookup tables described above, such as lookup tables 400c and 400d of FIGS. 4C and 4D, respectively. In an embodiment, the memory structure is a compact, fast memory structure. In an embodiment, the memory structure is a content addressable memory. Other memory structures may be used.

In other embodiments, a portion of memory array 702 may be used to store lookup tables described above, such as lookup tables 400c and 400d of FIGS. 4C and 4D, respectively.

In one embodiment, all of the components depicted in FIG. 7 are arranged on a single integrated circuit. For example, system control logic 708, column control circuitry 716 and row control circuitry 704 are formed on the surface of a substrate and memory array 702 is formed one or above the substrate.

In an embodiment, one or more of memory array 702, row control circuitry 704, column control circuitry 716 and system control logic 708 constitute a system control circuit that includes hardware and/or software configured to implement the methods 300*a*, 300*b*, 500 and 600 of FIGS. 3A, 3B, 5 and 6, respectively.

Although the technology described above and the example methods 300*a*, 300*b*, 500 and 600 of FIGS. 3A, 3B, 5 and 6, respectively, have been described with reference to MRAM memory cells, persons of ordinary skill in the art will understand that the technology may be used with any resistance-switching memory cells, including MRAM memory cells, phase change memory cells, reversible resistance-switching random access memory cell (ReRAM) memory cells, and other resistance-switching memory cells. In addition, the technology described above and the example methods 300*a*, 300*b*, 500 and 600 of FIGS. 3A, 3B, 5 and 6, respectively, respectively, may be used with blocks of multiple resistance-switching memory cells.

One embodiment includes an apparatus that includes a memory array and a control circuit. The memory array includes non-volatile memory cells each including a resistive random access memory element. The control circuit is configured to receive a read command that specifies an address of a first group of the non-volatile memory cells, use a first predetermined read reference value to perform a first read of the first group of the non-volatile memory cells to provide first read data, while performing the first read, retrieve from a memory a second predetermined read reference value corresponding to the specified address, and in response to a condition being satisfied regarding the first read data, use the second predetermined read reference value to perform a second read of the first group of the non-volatile memory cells to provide second read data.

One embodiment includes a method that includes receiving a command to read a first codeword from a memory array including a plurality of codewords that collectively include a corresponding first predetermined read reference value, each of the codewords including a corresponding second predetermined read reference value, reading the first codeword using the first predetermined read reference value to provide first read data, while reading the first codeword retrieving from a lookup table the second predetermined read reference value corresponding to the first codeword, decoding the first read data using an error correction code algorithm, determining that the error correction code algorithm was unable to correctly decode the first read data, and reading the first codeword using the retrieved second predetermined read reference value to provide second read data.

One embodiment includes a system that includes a control circuit configured to receive a command from a host device to read a first group of non-volatile memory cells in a memory array including a plurality of groups of memory cells, perform a first read the first group of non-volatile memory cells using a first predetermined read reference value, retrieve a second predetermined read reference value from a lookup table, and selectively perform a second read of the first group of non-volatile memory cells using the second predetermined read reference value only if data read during the first read failed to correctly decode. The retrieve step is performed in parallel with the first read step. The first predetermined read reference value minimizes a failed bit count across all of the groups of memory cells. The second predetermined read reference minimizes a failed bit count of the first group of memory cells.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. An apparatus comprising:

a memory array comprising a plurality of groups of Magnetoresistive Random Access Memory (MRAM) cells each comprising a resistive random access memory element and having a corresponding unique address; and a control circuit configured to:

receive a read command that specifies an address of a first group of MRAM memory cells of the plurality of groups of MRAM non-volatile memory cells;

use a first predetermined read reference value to perform a first read of the first group of the MRAM memory cells to provide first read data, wherein the first predetermined read reference value is selected based on a lowest number of bit errors among the plurality of groups of MRAM when read with a plurality of candidate read reference values:

while performing the first read, retrieve from a memory a second predetermined read reference value corresponding to the specified address, wherein the second predetermined read reference value is selected based on a number of failed bits above a predetermined maximum among the plurality of groups of MRAM when read with a plurality of, second predetermined read reference values; and in response to the first read data failing an error correction coding check, use the second predetermined read reference value to perform a second read of the first group of the non-volatile memory cells to provide second read data.

2. The apparatus of claim 1, wherein the memory array comprises:

a plurality of first conductive lines; and a plurality of second conductive lines, each of the plurality of MRAM cells are connected between one of the first conductive lines and one of the second conductive lines.

3. The apparatus of claim 1, wherein the memory comprises a lookup table configured to store addresses and corresponding second predetermined read reference values.

4. The apparatus of claim 1, wherein the memory comprises a content addressable memory.

5. The apparatus of claim 1, wherein:

the apparatus further comprises a device configured to decode data read from the MRAM cells; and the condition being satisfied comprises a failure to correctly decode the first read data.

6. The apparatus of claim 5, wherein the device comprises an error correction coding engine.

7. A method comprising:

receiving a command to read a first codeword from a memory array comprising a plurality of groups of Magnetoresistive Random Access Memory (MRAM) cell and a plurality of codewords that collectively comprise a corresponding first predetermined read reference value, each of the codewords comprising a corresponding second predetermined read reference value wherein the first predetermined read reference value is selected based on a lowest number of bit errors among the plurality of groups of MRAM when read with a plurality of candidate read reference values;

reading the first codeword using the first predetermined read reference value to provide first read data;

while reading the first codeword, retrieving from a lookup table the second predetermined read reference value corresponding to the first codeword, wherein the second predetermined read reference value is one of a plurality of second predetermined read reference values, each of the plurality of second predetermined read reference values corresponding to each candidate read reference value with codeword having a number of failed bits above a predetermined maximum number of failed bits;

decoding the first read data using an error correction code algorithm;

determining that the error correction code algorithm was unable to correctly decode the first read data; and reading the first codeword using the retrieved second predetermined read reference value to provide second read data.

8. The method of claim 7, further comprising:

decoding the second read data using the error correction code algorithm; and determining that the error correction code algorithm was able to correctly decode the second read data.

9. The method of claim 7, wherein the lookup table comprises a content addressable memory.

10. The method of claim 7, wherein a time required to retrieve the second predetermined read reference value from the lookup table is less than or equal to a time required to complete reading the first codeword.

11. A system comprising:

a control circuit configured to:

receive a command from a host device to read a first groups of Magnetoresistive Random Access Memory (MRAM) cells in a memory array comprising a plurality of groups of memory cells;

perform a first read of the first group of MRAM cells using a first predetermined read reference value wherein the first predetermined read reference value is selected based on a lowest number of bit errors among the plurality of groups of MRAM when read with a plurality of candidate read reference values;

retrieve a second predetermined read reference value from a lookup table, wherein the second predetermined read reference value is one of a plurality of second predetermined read reference values, each of the plurality of second predetermined read reference values corresponding to each candidate read reference value with a group of MRAM memory cells having a number of failed bits above a predetermined maximum number of failed bits; and selectively perform a second read of the first group of MRAM cells using the second predetermined read reference value only if data read during the first read failed to correctly decode, wherein:

the retrieve step is performed in parallel with the first read step;

the first predetermined read reference value minimizes a failed bit count across all of the groups of MRAM cells; and the second predetermined read reference minimizes a failed bit count of the first group of MRAM cells.

* * * * *